US012639662B2

(12) United States Patent
Kairali et al.

(10) Patent No.: US 12,639,662 B2
(45) Date of Patent: May 26, 2026

(54) SELECTIVE TRANSFER OF INVENTORY ON TEMPORARY BASIS

(71) Applicant: INTERNATIONAL BUSINESS MACHINES CORPORATION, Armonk, NY (US)

(72) Inventors: Sudheesh S. Kairali, Kozhikode (IN); Sudhanshu Sekher Sar, Bangalore (IN); Sarbajit K. Rakshit, Kolkata (IN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 195 days.

(21) Appl. No.: 18/051,120

(22) Filed: Oct. 31, 2022

(65) Prior Publication Data

US 2024/0144175 A1 May 2, 2024

(51) Int. Cl.
*G06Q 10/087* (2023.01)

(52) U.S. Cl.
CPC .................................. *G06Q 10/087* (2013.01)

(58) Field of Classification Search
CPC ...................................................... G06Q 10/087
See application file for complete search history.

(56) References Cited

U.S. PATENT DOCUMENTS

| | | | |
|---|---|---|---|
| 8,447,664 B1 | 5/2013 | Pape | |
| 11,101,038 B2 | 8/2021 | Szeto | |
| 11,164,147 B2 | 11/2021 | Dejong | |

(Continued)

FOREIGN PATENT DOCUMENTS

| | | |
|---|---|---|
| CN | 113128932 A | 7/2021 |
| JP | 2021157757 A | 10/2021 |
| WO | 2022/133466 A1 | 6/2022 |

OTHER PUBLICATIONS

Seung Hwan Won, Allocating Storage Spaces for Temporary Inventories Considering Handling, Transportation, and Storage Capacities, 2006, Proceedings of the Second International Intelligent Logistics Systems Conference, pp. 22.1-22.13 (Year: 2006).*

(Continued)

*Primary Examiner* — Aaron Tutor
(74) *Attorney, Agent, or Firm* — Robert R. Aragona

(57) ABSTRACT

An embodiment for selectively transferring inventory on a temporary basis is provided. The embodiment may include receiving real-time and historical data relating to a plurality of products in a storage facility. The embodiment may also include identifying one or more high priority products during a selected timeframe. The embodiment may further include predicting a required amount of space in the storage facility to store the one or more high priority products. The embodiment may also include in response to determining the storage facility does not have the required amount of space, assigning a level of priority to each remaining product. The embodiment may further include identifying a transportation vehicle and a transit location of the transportation vehicle to temporarily store at least one first remaining product with a medium priority level. The embodiment may also include autonomously loading the transportation vehicle with the at least one first remaining product.

14 Claims, 4 Drawing Sheets

(56)        References Cited

U.S. PATENT DOCUMENTS

| | | | |
|---|---|---|---|
| 2016/0078510 A1* | 3/2016 | Gadre | G06Q 30/0611 |
| | | | 705/26.4 |
| 2017/0330144 A1* | 11/2017 | Wakim | G06Q 10/083 |
| 2019/0258979 A1 | 8/2019 | Avinash | |
| 2019/0303849 A1* | 10/2019 | Boggarapu | G06Q 30/0205 |
| 2021/0065844 A1 | 3/2021 | Merril | |
| 2021/0319907 A1 | 10/2021 | Harley et al. | |
| 2023/0306846 A1 | 9/2023 | Sasatani et al. | |

OTHER PUBLICATIONS

Disclosed Anonymously, "Method and System for optimum omnichannel inventory allocation and intelligent inventory re-balancing", IP.com, IPCOM000256777D, Dec. 29, 2018, 6 Pages. Retrieved from Internet: https://ip.com/IPCOM/000256777.

Sasatani, et al., "Dynamic Parking Management System", Application and Drawings, filed Mar. 9, 2022, U.S. Appl. No. 17/654,081, 37 Pages.

Bobek et al. "Explanation-Driven Model Stacking", Lecture Notes in Computer Science, Jun. 2021, 11 pages.

Friedler et al. "Assessing the Local Interpretability of Machine Learning Models", arXiv:1902.03501 [cs.LG], Feb. 9, 2019, 20 pages.

Markus et al. "The role of explainability in creating trustworthy artificial intelligence for health care: a comprehensive survey of the terminology, design choices, and evaluation strategies", Department of Medical Informatics, Erasmus University Medical Center, Rotterdam, The Netherlands, Dec. 3, 2020, 31 pages.

Smith-Renner et al. "No Explainability without Accountability: An Empirical Study of Explanations and Feedback in Interactive ML", CHI '20: Proceedings of the 2020 CHI Conference on Human Factors in Computing Systems, Apr. 23, 2020, pp. 1-13, https://doi.org/10.1145/3313831.3376624.

Sokol et al. "Explainability Fact Sheets: A Framework for Systematic Assessment of Explainable Approaches", FAT* '20: Proceedings of the 2020 Conference on Fairness, Accountability, and Transparency, Jan. 27, 2020, pp. 56-67, https://doi.org/10.1145/3351095.3372870.

Zhou et al. "Evaluating the Quality of Machine Learning Explanations: A Survey on Methods and Metrics", Electronics, Mar. 4, 2021, 19 pages.

* cited by examiner

100

COMPUTER 101

PROCESSOR SET 110

PROCESSING CIRCUITRY 120          CACHE 121

COMMUNICATION FABRIC 111

VOLATILE MEMORY 112

PERSISTENT STORAGE 113

OPERATING SYSTEM 122

INVENTORY TRANSFER PROGRAM 150

PERIPHERAL DEVICE SET 114

UI DEVICE SET 123          STORAGE 124          IoT SENSOR SET 125

NETWORK MODULE 115

WAN 102

END USER DEVICE 103

REMOTE SERVER 104

REMOTE DATABASE 130

PRIVATE CLOUD 106

GATEWAY 140

PUBLIC CLOUD 105

CLOUD ORCHESTRATION MODULE 141          HOST PHYSICAL MACHINE SET 142

VIRTUAL MACHINE SET 143          CONTAINER SET 144

Deploy transportation vehicle to identified location. 218

Autonomously unload transportation vehicle and move at least one first remaining product back to storage facility. 220

END

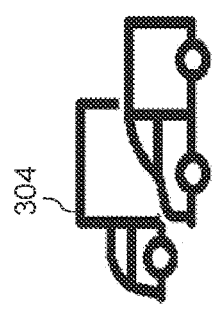
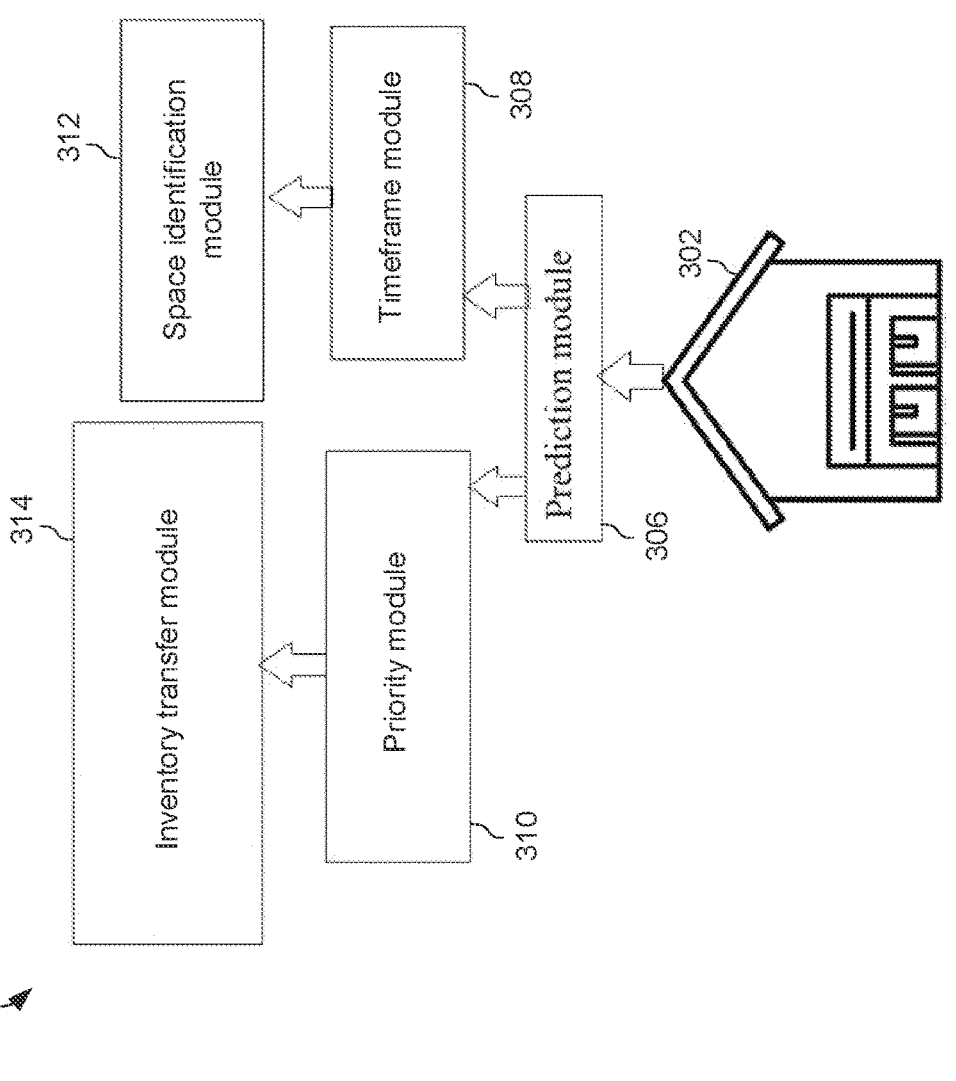
FIG. 3

SELECTIVE TRANSFER OF INVENTORY ON TEMPORARY BASIS

BACKGROUND

The present invention relates generally to the field of computing, and more particularly to a system for selectively transferring inventory on a temporary basis.

Warehouses, as well as showrooms and other retail spaces, store a variety of different types of products. Depending upon the time of year and the product type, some of these products may be more in demand than other products. The products that are in demand may therefore sell more quickly than products that are not in demand or that will not be in demand until the following season. For example, a long-sleeve jacket may not be in demand in July, but may be in demand in the autumn and winter months. The warehouses, showrooms, and/or other retail spaces may have different capacities as well as different locations in a geographical area. Based on the needs in the geographical area, the products may be transferred from one location to another.

SUMMARY

According to one embodiment, a method, computer system, and computer program product for selectively transferring inventory on a temporary basis is provided. The embodiment may include receiving real-time and historical data relating to a plurality of products in a storage facility. The embodiment may also include identifying one or more high priority products in the plurality of products during a selected timeframe based on the real-time and the historical data. The embodiment may further include predicting a required amount of space in the storage facility to store the one or more high priority products based on an estimated sale rate of the one or more high priority products during the selected timeframe. The embodiment may also include in response to determining the storage facility does not have the required amount of space, assigning a level of priority to each remaining product in the plurality of products based on the historical data. At least one first remaining product is assigned a medium priority level and at least one second remaining product is assigned a low priority level. The embodiment may further include identifying a transportation vehicle and a transit location of the transportation vehicle to temporarily store the at least one first remaining product with the medium priority level. The embodiment may also include autonomously loading the transportation vehicle with the at least one first remaining product with the medium priority level.

BRIEF DESCRIPTION OF THE SEVERAL VIEWS OF THE DRAWINGS

These and other objects, features and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. In the drawings:

FIG. 1 illustrates an exemplary computing environment according to at least one embodiment.

FIG. 3 is a diagram depicting an interaction between solution components of the process in FIGS. 2A and 2B according to at least one embodiment.

DETAILED DESCRIPTION

Figure 2A:
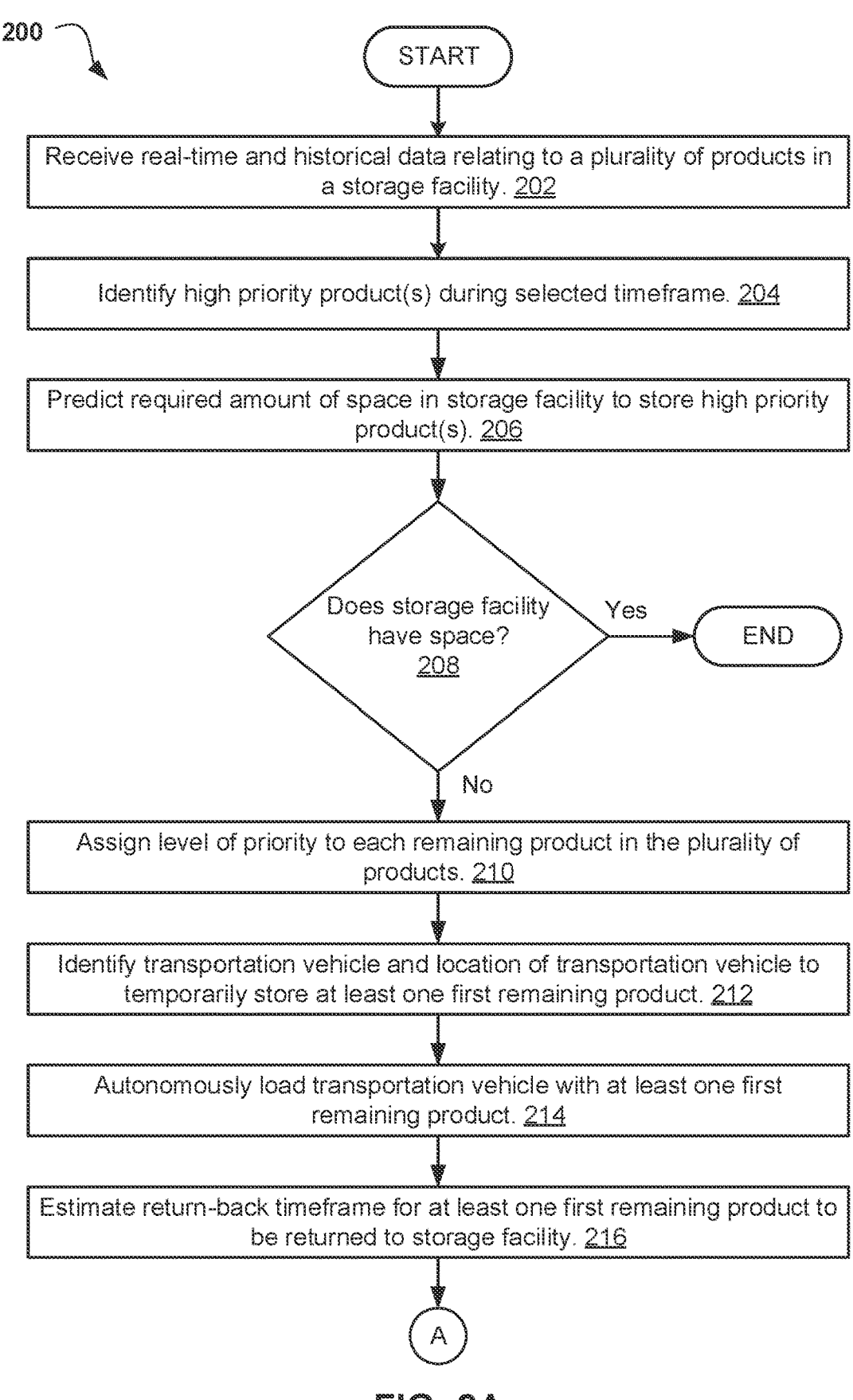
FIGS. 2A and 2B illustrate an operational flowchart for selectively transferring inventory on a temporary basis in a selective inventory transfer process according to at least one embodiment.

Detailed embodiments of the claimed structures and methods are disclosed herein; however, it can be understood that the disclosed embodiments are merely illustrative of the claimed structures and methods that may be embodied in various forms. This invention may, however, be embodied in many different forms and should not be construed as limited to the exemplary embodiments set forth herein. In the description, details of well-known features and techniques may be omitted to avoid unnecessarily obscuring the presented embodiments.

It is to be understood that the singular forms "a," "an," and "the" include plural referents unless the context clearly dictates otherwise. Thus, for example, reference to "a component surface" includes reference to one or more of such surfaces unless the context clearly dictates otherwise.

Embodiments of the present invention relate to the field of computing, and more particularly to a system for selectively transferring inventory on a temporary basis. The following described exemplary embodiments provide a system, method, and program product to, among other things, identify a transportation vehicle and a location of the transportation vehicle to temporarily store at least one product with a medium priority level and, accordingly, autonomously load the transportation vehicle with the at least one product with the medium priority level. Therefore, the present embodiment has the capacity to improve industrial technology by dynamically creating the required space for high-priority products in a storage facility and returning lower priority products back to the storage facility in an autonomous manner.

As previously described, warehouses, as well as showrooms and other retail spaces, store a variety of different types of products. Depending upon the time of year and the product type, some of these products may be more in demand than other products. The products that are in demand may therefore sell more quickly than products that are not in demand or that will not be in demand until the following season. For example, a long-sleeve jacket may not be in demand in July, but may be in demand in the autumn and winter months. The warehouses, showrooms, and/or other retail spaces may have different capacities as well as different locations in a geographical area. Based on the needs in the geographical area, the products may be transferred from one location to another. The warehouse and/or other retail spaces may not have sufficient space to store every product in inventory. This problem is typically addressed by discounting those products that are in less demand. However, discounting those products that are in less demand has no guarantee that these products will sell and fails to proactively remove these products as inventory.

It may therefore be imperative to have a system in place to proactively remove selective lower priority products from the warehouse and/or other retail spaces such that the required space can be created for higher priority products. Thus, embodiments of the present invention may provide advantages including, but not limited to, dynamically creating the required space for high-priority products in a storage facility, quickly returning lower priority products back to the storage facility in an autonomous manner after a selected timeframe, and booking an appropriate transportation vehicle. The present invention does not require that all advantages need to be incorporated into every embodiment of the invention.

According to at least one embodiment, when moving products in a storage facility, real-time and historical data relating to a plurality of products in the storage facility may be received in order to identify one or more high priority products in the plurality of products during a selected timeframe based on the real-time and the historical data. Upon identifying the one or more high priority products, a required amount of space in the storage facility to store the one or more priority products may be predicted based on an estimated sale rate of the one or more high priority products during the selected timeframe so that it may be determined whether the storage facility has the required amount of space. In response to determining the storage facility does not have the required amount of space, a level of priority may be assigned to each remaining product in the plurality of products based on the historical data, where at least one first remaining product may be assigned a medium priority level and at least one second remaining product may be assigned a low priority level. Then, a transportation vehicle and a transit location of the transportation vehicle to temporarily store the at least one first remaining product with the medium priority level may be identified such that the transportation vehicle may be autonomously loaded with the at least one first remaining product with the medium priority level. According to at least one embodiment, the identified transit location may be a parking lot. According to at least one other embodiment, the identified transit location may be a parking garage. According to at least one further embodiment, the identified transit location may be a curbside parking space on a street. Upon autonomously loading the transportation vehicle, a return-back timeframe for the at least one first remaining product with the medium priority level may be estimated in order to automatically deploy the transportation vehicle to the identified transit location based on the return-back time frame. Once the return-back timeframe is estimated, the transportation vehicle may be autonomously unloaded and the at least one first remaining product with the medium priority level may be moved back to the storage facility after the selected timeframe ends.

The present invention may be a system, a method, and/or a computer program product at any possible technical detail level of integration. The computer program product may include a computer readable storage medium (or media) having computer readable program instructions thereon for causing a processor to carry out aspects of the present invention.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed concurrently or substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The following described exemplary embodiments provide a system, method, and program product to identify a transportation vehicle and a location of the transportation vehicle to temporarily store at least one product with a medium priority level and, accordingly, autonomously load the transportation vehicle with the at least one product with the medium priority level.

Referring to FIG. 1, an exemplary computing environment 100 is depicted, according to at least one embodiment. Computing environment 100 contains an example of an environment for the execution of at least some of the computer code involved in performing the inventive methods, such as an inventory transfer program 150. In addition to block 150, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and block 200, as identified above), peripheral device set 114 (including user interface (UI) device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

Computer 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

Processor set 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip."

In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in block 200 in persistent storage 113.

Communication fabric 111 is the signal conduction paths that allow the various components of computer 101 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

Volatile memory 112 is any type of volatile memory now known or to be developed in the future. Examples include dynamic type random access memory (RAM) or static type RAM. Typically, the volatile memory 112 is characterized by random access, but this is not required unless affirmatively indicated. In computer 101, the volatile memory 112 is located in a single package and is internal to computer 101, but, alternatively or additionally, the volatile memory 112 may be distributed over multiple packages and/or located externally with respect to computer 101.

Persistent storage 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage 113 allows writing of data, deletion of data and re-writing of data. Some familiar forms of persistent storage 113 include magnetic disks and solid state storage devices. Operating system 122 may take several forms, such as various known proprietary operating systems or open source Portable Operating System Interface type operating systems that employ a kernel. The code included in block 150 typically includes at least some of the computer code involved in performing the inventive methods.

Peripheral device set 114 includes the set of peripheral devices of computer 101. Data communication connections between the peripheral devices 114 and the other components of computer 101 may be implemented in various ways, such as Bluetooth connections, Near-Field Communication (NFC) connections, connections made by cables (such as universal serial bus (USB) type cables), insertion type connections (for example, secure digital (SD) card), connections made through local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database), this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector. Peripheral device set 114 may also include a transportation vehicle, a robotic device, a drone, and/or any other device for performing labor related tasks.

Network module 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN may be replaced and/or supplemented by local area networks (LANs) designed to communicate data between devices located in a local area, such as a Wi-Fi network. The WAN 102 and/or LANs typically include computer hardware such as copper transmission cables, optical transmission fibers, wireless transmission, routers, firewalls, switches, gateway computers and edge servers.

End user device (EUD) 103 is any computer system that is used and controlled by an end user (for example, a customer of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

Remote server 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

Public cloud 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

Private cloud 106 is similar to public cloud 105, except that the computing resources are only available for use by a single enterprise. While private cloud 106 is depicted as being in communication with WAN 102, in other embodiments the private cloud 106 may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

According to the present embodiment, the inventory transfer program 150 may be a program capable of receiving real-time and historical data relating to a plurality of products in a storage facility, identifying a transportation vehicle and a location of the transportation vehicle to temporarily store at least one product with a medium priority level, autonomously loading the transportation vehicle with the at least one product with the medium priority level, dynamically creating the required space for high-priority products in the storage facility, quickly returning lower priority products back to the storage facility in an autonomous manner after a selected timeframe, and booking an appropriate transportation vehicle. Furthermore, notwithstanding depiction in computer 101, the accident visualization program 150 may be stored in and/or executed by, individually or in any combination, end user device 103, remote server 104, public cloud 105, and private cloud 106. The inventory transfer method is explained in further detail below with respect to FIGS. 2A and 2B. It may be appreciated that the examples described below are not intended to be limiting, and that in embodiments of the present invention the parameters used in the examples may be different.

Figure 2B:
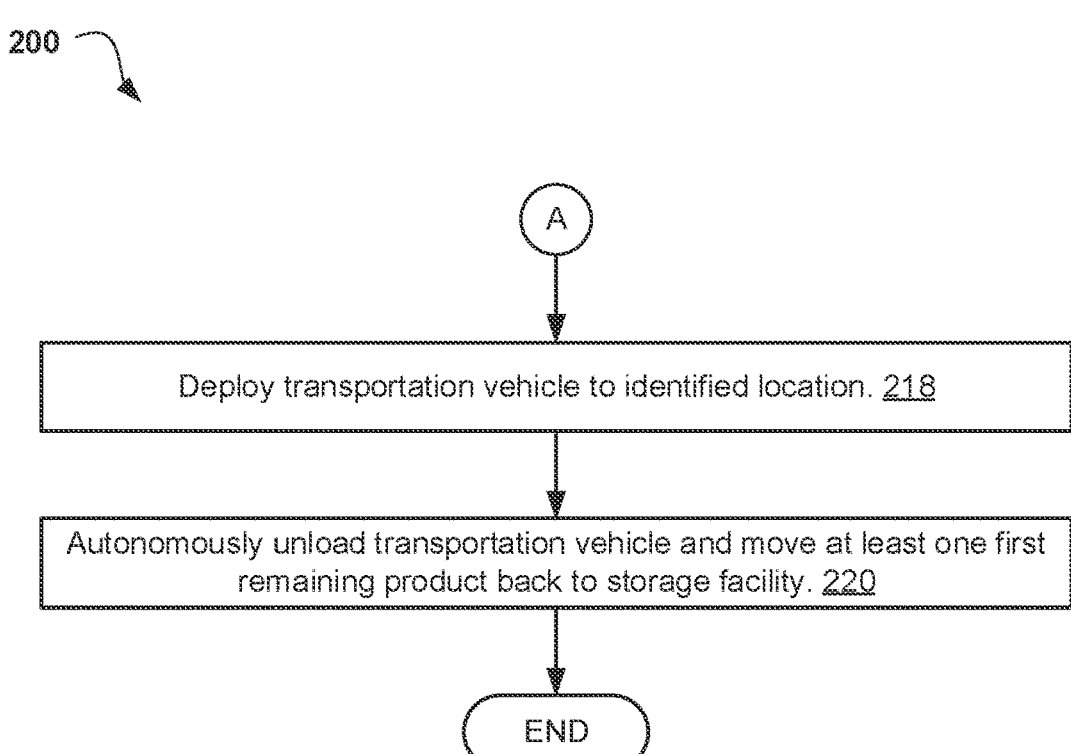

Referring now to FIGS. 2A and 2B, an operational flowchart for selectively transferring inventory on a temporary basis in a selective inventory transfer process 200 is depicted according to at least one embodiment. At 202, the inventory transfer program 150 receives the real-time and historical data relating to the plurality of products in the storage facility. Examples of the storage facility may include, but are not limited to, a warehouse, a showroom, and/or any other retail space. Examples of the plurality of products may include, but are not limited to, food items, clothing, and/or consumer devices (e.g., smartphones and kitchen appliances).

The real-time data relating to the plurality of products may include customer demands within a geographical location as influenced by season, upcoming sales, and/or local events (e.g., skiing and hiking). The real-time data may also include present inventory outbound flow rate within a sliding time window. For example, a winter jacket may sell at a rate of two jackets per hour from November $15^{th}$ through December $15^{th}$. The real-time data may be received from the internet and/or the remote database 130 via the network module 115. For example, time data may be used by the inventory transfer program 150 to infer the season. Continuing the example, November $15^{th}$ may be indicative that the season is fall. Similarly, any upcoming sales and local events may be stored in the remote database 130 and/or this information may be obtained from a website.

The historical data relating to the plurality of products may include historical sales during prior seasons, prior discounted sales, as well as a rate of selling during prior local events. The historical data may also include the rate of sale of each product during a prior sliding time window. In embodiments of the present invention, the real-time data becomes the historical data after a pre-defined period of time. For example, the pre-defined period of time may be one year or more from the present date. The historical data may be contained in a knowledge corpus, which may be accessed by the inventory transfer program 150 as described above.

Then, at 204, the inventory transfer program 150 identifies the one or more high priority products in the plurality of products during the selected timeframe. The one or more high priority products are identified based on the real-time and the historical data. As used herein, a "high priority product" is an in-demand product for which room is to be made in the storage facility during the selected timeframe. The selected timeframe may be a time in the future and may be chosen by a user, such as a store manager or a warehouse manager, or derived by a timeframe module, described in further detail below with respect to the description of FIG. 3. For example, when the present date is November $20^{th}$, the selected timeframe may be the entire winter season (e.g., December $21^{st}$ through March $21^{st}$). Thus, the one or more high priority products may be those products which sell more quickly relative to other products. Continuing the example described above where the winter jacket may sell at a rate of two jackets per hour from November $15^{th}$ through December $15^{th}$, the winter jacket may be identified as a high priority product.

Also, as described above with respect to step 202, a planned discounted sale in the price of the product during the selected timeframe may result in the identification of the product as a high priority product. For example, where the selected timeframe is December $21^{st}$ through March $21^{st}$, the inventory transfer program 150 may access the historical data stored in the knowledge corpus to identify prior discounted sales during that time period in the past (e.g., December $21^{st}$ through March $21^{st}$ of the previous year). Continuing the example, when the historical data of prior discounted sales indicates the prior discounted sale was a success (e.g., selling the target number of products), the product may be identified as a high priority product. Furthermore, as described above with respect to step 202, a local event during the selected timeframe may result in the identification of the product as a high priority product. For example, where the selected timeframe is December $21^{st}$ through March $21^{st}$, the inventory transfer program 150 may access the historical data stored in the knowledge corpus to identify the rate of selling during prior local events. Continuing the example, when the historical data of the rate of selling during prior local events indicates an uptick in the rate of selling of the product, then when the same local event is scheduled in the future the product may be identified as a high priority product.

Next, at 206, the inventory transfer program 150 predicts the required amount of space in the storage facility to store the one or more high priority products. The required amount of space is identified based on the estimated sale rate of the one or more high priority products during the selected timeframe. As described above with respect to step 204, the estimated sale rate may be predicted from the real-time and the historical data. For example, where the real-time data indicates the winter jacket sells at a rate of two jackets per hour from November $15^{th}$ through December $15^{th}$, and when the historical data indicates this rate is expected to continue during the selected time period (e.g., December $21^{st}$ through March $21^{st}$), the required amount of space may be enough space to store the total number of the high priority product expected to sell during the business day. Continuing the example, where the business hours of the storage facility is 9 a.m.-5 p.m. (i.e., 8 hours), then when the rate is two jackets per hour, the storage facility should have enough space to sell 8*2=16 jackets. It may be appreciated that in embodiments of the present invention where the storage facility is the warehouse (i.e., a location that does not directly sell products), the required amount of space for the warehouse may be enough space to store the high priority products that are to be moved to the retail location.

In another example, in addition to the jackets, a kitchen appliance (e.g., a mixer) may also be identified as a high priority product during the selected timeframe (e.g., December $21^{st}$ through March $21^{st}$). Continuing the example, where the estimated sale rate of the mixer is three mixers per hour, and where the business hours of the storage facility is 9 a.m.-5 p.m. (i.e., 8 hours), then the storage facility should have enough space to sell the 16 jackets and 8*3=24 mixers. Thus, in embodiments of the present invention, more space may be required for one high priority product than is required for another high priority product.

Then, at 208, the inventory transfer program 150 determines whether the storage facility has the required amount of space. The determination may be made based on the maximum product storage capacity of the storage facility. The inventory transfer program 150 may access an inventory database, such as the remote database 130, to identify the total number of products currently occupying the storage facility and the types of these products. Continuing the example described above where the storage facility should have enough space to sell the 16 jackets and 24 mixers, then the required amount of space may be 24+16=40 high priority products. When the maximum capacity is, for example, 100 total products, and when 70 other products are currently occupying the storage facility, the storage facility may not have the required amount of space. In another example, the required amount of space may be 40 high priority products. Continuing the example, when the maximum capacity is also 100 total products, and when 60 other products are currently occupying the storage facility, the storage facility may have the required amount of space.

In response to determining the storage facility does not have the required amount of space (step 208, "No" branch), the selective inventory transfer process 200 proceeds to step 210 to assign the level of priority to each remaining product in the plurality of products. In response to determining the storage facility does have the required amount of space (step 208, "Yes" branch), the selective inventory transfer process 200 ends.

Next, at 210, the inventory transfer program 150 assigns the level of priority to each remaining product in the plurality of products. The level of priority is assigned during the selected timeframe based on the historical data. According to at least one embodiment, at least one first remaining product is assigned a medium priority level and at least one second remaining product is assigned a low priority level. As used herein, a "medium priority product" is a product which is to be moved to the transportation vehicle during the selected timeframe, described in further detail below with respect to steps 212 and 214. Also, as used herein, a "low priority product" is a product which is to be sold at a discount and that may not be moved to the transportation vehicle during the selected timeframe.

The at least one first remaining product with the medium priority level may be a product that is expected to earn high priority status immediately after the selected timeframe ends. For example, a windbreaker may not be a high priority product during the selected timeframe (e.g., December $21^{st}$ through March $21^{st}$), but the historical data may indicate that the windbreaker may become a high priority product in the spring months (e.g., March $22^{nd}$ through June $22^{nd}$).

The at least one second remaining product with the low priority level may be a product that is not expected to earn high priority status immediately after the selected timeframe ends. For example, a short sleeve shirt may not be a high priority product during the selected timeframe (e.g., December $21^{st}$ through March $21^{st}$), and the historical data may indicate that the short sleeve shirt may not become a high priority product until the summer months (e.g., June $22^{nd}$ though September $22^{nd}$). Thus, rather than moving the at least one second remaining product with the low priority level to the transportation vehicle, the inventory transfer program 150 may recommend selling the low priority product at a discounted price to move (and therefore clear space in the storage facility) the low priority product.

According to at least one embodiment, the assignment of the level of priority may be performed by conducting a cost-benefit analysis between selling the remaining product at a discounted price and temporarily storing the remining product in the transportation vehicle. The inventory transfer program 150 may consider certain transportation vehicle parameters, including but not limited to, the cost of loading and unloading the transportation vehicle, the cost of parking and renting the transportation vehicle, and the cost of deploying the transportation vehicle (e.g., fuel cost) in the cost-benefit analysis. When the cost-benefit analysis indicates that selling the remaining product at the discounted price would be more profitable than temporarily storing the remaining product in the transportation vehicle, the inventory transfer program 150 may assign that remaining product with a low priority level.

According to at least one other embodiment, the assignment of the level of priority may be performed by considering the location of the storage facility and the location where each of the remaining products are to be stored. For example, when the storage facility and transportation vehicle are located in a perpetually hot geographical area, and where the remaining product is a perishable item, that remaining product may be assigned a low priority level. Similarly, when the storage facility is located in a geographical area with bumpy roadways, then when the remaining product is a fragile item, that remaining product may be assigned a low priority level. In this embodiment, the location of the storage facility along with the location where each of the remaining products are to be stored, the cost-benefit analysis data, and the estimated rate of sale data may be represented in accordance with a particular data structure, such as a 3-dimensional matrix.

Then, at 212, the inventory transfer program 150 identifies the transportation vehicle and the transit location of the transportation vehicle to temporarily store the at least one first remaining product with the medium priority level. The transportation vehicle may be identified based on the size of the at least one first remaining product and the cost of booking the transportation vehicle. For example, a transportation vehicle required for a washing machine and/or a refrigerator may be larger than a transportation vehicle for articles of clothing. In another example, when the size of the at least one first remaining product permits, a van may be cheaper to book than a truck. According to at least one embodiment, the transportation vehicle may be an autonomous vehicle, described in further detail below with respect to step 218. According to at least one other embodiment, the transportation vehicle may be a manually driven vehicle.

The transit location may be identified in accordance with the local parking regulations in the geographical area and the cost of parking. Examples of the transit location include, but are not limited to, a parking lot, a parking garage, and a curbside parking space on a roadway (i.e., street parking). For example, trucks of a certain size may be prohibited from parking on certain roadways and/or in certain parking lots and garages. In another example, when the size of the at least one first remaining product permits, a van may be cheaper to park at the transit location than a truck. According to at least one embodiment, the transit location may be identified based on the return-back timeframe, described in further detail below with respect to step 216.

Next, at 214, the inventory transfer program 150 autonomously loads the transportation vehicle with the at least one first remaining product with the medium priority level. Once the appropriate transportation vehicle is identified, the inventory transfer program 150 may automatically book the transportation vehicle. For example, the transportation vehicle may be booked online with the organization renting the transportation vehicle. According to at least one embodiment, a robotic device may autonomously load the transportation vehicle with the at least one first remaining product with the medium priority level. According to at least one other embodiment, a drone may autonomously load the transportation vehicle with the at least one first remaining product with the medium priority level. For example, the robotic device may be used to autonomously load the transportation vehicle when the at least one first remaining product is too heavy to be transported by the drone. Continuing the example, the robotic device may be used to load a refrigerator, and the drone may be used to load an article of clothing, such as a winter jacket. In either embodiment, the autonomous loading of the transportation vehicle may create the required amount of space in the storage facility, described above with respect to step 206.

Then, at 216, the inventory transfer program 150 estimates the return-back timeframe for the at least one first remaining product with the medium priority level to be returned to the storage facility. The return-back timeframe may be a period of time immediately after the selected timeframe when the at least one first remaining product with the medium priority level is expected to earn high priority status. For example, a windbreaker may not be a high priority product during the selected timeframe (e.g., December $21^{st}$ through March $21^{st}$), but the historical data may indicate that the windbreaker may become a high priority product in the spring months (e.g., March $22^{nd}$ through June $22^{nd}$). In this example, the return-back timeframe may be the period beginning March $22^{nd}$.

According to at least one embodiment, the transit location may be identified based on the return-back timeframe. In particular, a distance between the transit location of the transportation vehicle and the storage facility may be directly proportional to the length of the return-back timeframe. A longer return-back timeframe may result in a greater distance between the transit location of the transportation vehicle and the storage facility. For example, when the return-back timeframe for a short sleeve shirt is two months from the present date, and when the return-back timeframe for a refrigerator is four months from the present date, multiple transportation vehicles may be used, where the transportation vehicle containing the refrigerator is parked at a transit location farther from the storage facility than the transportation vehicle containing the short sleeve shirt.

Next, at 218, the inventory transfer program 150 automatically deploys the transportation vehicle to the identified transit location. The transportation vehicle is automatically deployed based on the return-back timeframe, as described above with respect to step 216.

As described above with respect to step 212, the transportation vehicle may be an autonomous vehicle. In such instance, the inventory transfer program 150 may send a signal to the autonomous vehicle to cause the autonomous vehicle to drive to the identified transit location. For example, where the identified transit location is a parking lot four miles away from the storage facility, the autonomous vehicle may drive to the parking lot four miles away from the storage facility.

According to at least one embodiment, while the transportation vehicle containing the at least one first remaining product with the medium priority level is parked at the identified transit location, the at least one first remaining product may be sold as inventory (i.e., the transportation vehicle may be used as a mobile marketplace). The at least one first remaining product may be sold as inventory in the mobile marketplace in response to determining there is consumer demand at the identified transit location based on the real-time and the historical data. For example, the real-time data may indicate that there is a fair taking place in a park adjacent to the identified transit location, and the historical data may indicate that a prior mobile marketplace sale near the fair was successful in the past. In this example, the inventory transfer program 150 may determine that there is consumer demand at the identified transit location.

Then, at 220, the inventory transfer program 150 autonomously unloads the transportation vehicle and moves the at least one first remaining product with the medium priority level back to the storage facility after the selected timeframe ends. Once the one or more high priority products are sold and the selected timeframe ends, inventory transfer program 150 may send a signal to the autonomous vehicle to cause the autonomous vehicle to drive back to the storage facility. Similar to the autonomous loading of the transportation vehicle described above with respect to step 214, the robotic device or the drone may autonomously unload the at least one first remaining product from the transportation vehicle and move the at least one first remaining product back into the storage facility.

Referring now to FIG. 3, a diagram 300 depicting an interaction between solution components of the process in FIGS. 2A and 2B is shown according to at least one embodiment. In the diagram 300, the storage facility 302 is used to store the one or more high priority products during the selected timeframe and the transportation vehicle 304 is used to store the at least one first remaining product with the medium priority level. A prediction module 306 may predict the one or more high priority products and may comprise a timeframe module 308. The timeframe module 308 may estimate the timeframe of the one or more high priority products. For example, the timeframe module 308 may estimate the timeframe to be from September $22^{nd}$ through December $22^{nd}$. The prediction module 306 may also comprise a priority module 310, which may predict the at least one first remaining product with the medium priority level and the at least one second remaining product with the low priority level. A space identification module 312 may predict the required amount of space in the storage facility 302 to store the one or more high priority products. For example, the space identification module 312 may estimate the storage facility 302 should have enough space for 100 high priority products. Finally, an inventory transfer module 314 may be used to autonomously transfer the at least one first remaining product between the storage facility 302 and the transportation vehicle 304.

It may be appreciated that FIGS. 2A, 2B, and 3 provide only an illustration of one implementation and do not imply any limitations with regard to how different embodiments may be implemented. Many modifications to the depicted environments may be made based on design and implementation requirements.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-based method of selectively transferring inventory on a temporary basis, the method comprising:
   receiving real-time and historical data relating to a plurality of products in a storage facility;
   identifying one or more high priority products in the plurality of products during a selected timeframe based on the real-time and the historical data;
   predicting a required amount of space in the storage facility to store the one or more high priority products based on an estimated sale rate of the one or more high priority products during the selected timeframe;
   determining whether the storage facility has the required amount of space;
   in response to determining the storage facility does not have the required amount of space, assigning a level of priority to each remaining product in the plurality of products based on the historical data, wherein at least one first remaining product is assigned a medium priority level and at least one second remaining product is assigned a low priority level;
   identifying a transportation vehicle and a transit location of the transportation vehicle to park to temporarily store the at least one first remaining product with the medium priority level;
   autonomously loading the transportation vehicle with the at least one first remaining product with the medium priority level, wherein autonomously loading the transportation vehicle further includes causing a robotic device to load the transportation vehicle with the at least one first remaining product based on determining the at least one first remaining product exceeds a pre-determined weight threshold
   estimating a return-back timeframe for the at least one first remaining product with the medium priority level to be returned to the storage facility;
   automatically deploying the transportation vehicle to the identified transit location based on the return-back timeframe; and
   autonomously unloading the transportation vehicle and moving the at least one first remaining product with the medium priority level back to the storage facility after the selected timeframe ends, wherein autonomously unloading the transportation vehicle further includes causing the robotic device to unload the at least one first remaining product from the transportation vehicle.

2. The computer-based method of claim 1, wherein the return-back timeframe is a period of time immediately after the selected timeframe when the at least one first remaining product with the medium priority level is expected to earn high priority status.

3. The computer-based method of claim 1, wherein a distance between the transit location of the transportation vehicle and the storage facility is directly proportional to a length of the return-back timeframe, wherein a longer return-back timeframe results in a greater distance between the transit location of the transportation vehicle and the storage facility.

4. The computer-based method of claim 1, wherein the at least one first remaining product with the medium priority level is sold as inventory while stored in the transportation vehicle at the identified transit location in response to determining there is consumer demand at the identified transit location based on the real-time and the historical data.

5. The computer-based method of claim 1, wherein the identified transit location is selected from a group consisting of a parking lot, a parking garage, and a curbside parking space.

6. A computer system, the computer system comprising:
   one or more processors, one or more computer-readable memories, one or more computer-readable tangible storage medium, and program instructions stored on at least one of the one or more computer-readable tangible storage medium for execution by at least one of the one or more processors via at least one of the one or more computer-readable memories, wherein the computer system is capable of performing a method comprising:
   receiving real-time and historical data relating to a plurality of products in a storage facility;
   identifying one or more high priority products in the plurality of products during a selected timeframe based on the real-time and the historical data;
   predicting a required amount of space in the storage facility to store the one or more high priority products based on an estimated sale rate of the one or more high priority products during the selected timeframe;
   determining whether the storage facility has the required amount of space;
   in response to determining the storage facility does not have the required amount of space, assigning a level of priority to each remaining product in the plurality of products based on the historical data, wherein at least one first remaining product is assigned a medium priority level and at least one second remaining product is assigned a low priority level;
   identifying a transportation vehicle and a transit location of the transportation vehicle to park to temporarily store the at least one first remaining product with the medium priority level;
   autonomously loading the transportation vehicle with the at least one first remaining product with the medium priority level, wherein autonomously loading the transportation vehicle further includes causing a robotic device to load the transportation vehicle with the at least one first remaining product based on determining the at least one first remaining product exceeds a pre-determined weight threshold
   estimating a return-back timeframe for the at least one first remaining product with the medium priority level to be returned to the storage facility;
   automatically deploying the transportation vehicle to the identified transit location based on the return-back timeframe; and
   autonomously unloading the transportation vehicle and moving the at least one first remaining product with the medium priority level back to the storage facility after the selected timeframe ends, wherein autonomously unloading the transportation vehicle further includes causing the robotic device to unload the at least one first remaining product from the transportation vehicle.

7. The computer system of claim 6, wherein the return-back timeframe is a period of time immediately after the selected timeframe when the at least one first remaining product with the medium priority level is expected to earn high priority status.

8. The computer system of claim 6, wherein a distance between the transit location of the transportation vehicle and the storage facility is directly proportional to a length of the return-back timeframe, wherein a longer return-back timeframe results in a greater distance between the transit location of the transportation vehicle and the storage facility.

9. The computer system of claim 6, wherein the at least one first remaining product with the medium priority level is sold as inventory while stored in the transportation vehicle at the identified transit location in response to determining there is consumer demand at the identified transit location based on the real-time and the historical data.

10. The computer system of claim 6, wherein the identified transit location is selected from a group consisting of a parking lot, a parking garage, and a curbside parking space.

11. A computer program product, the computer program product comprising:

one or more computer-readable tangible storage medium and program instructions stored on at least one of the one or more computer-readable tangible storage medium, the program instructions executable by a processor capable of performing a method, the method comprising:

receiving real-time and historical data relating to a plurality of products in a storage facility;

identifying one or more high priority products in the plurality of products during a selected timeframe based on the real-time and the historical data;

predicting a required amount of space in the storage facility to store the one or more high priority products based on an estimated sale rate of the one or more high priority products during the selected timeframe;

determining whether the storage facility has the required amount of space;

in response to determining the storage facility does not have the required amount of space, assigning a level of priority to each remaining product in the plurality of products based on the historical data, wherein at least one first remaining product is assigned a medium priority level and at least one second remaining product is assigned a low priority level;

identifying a transportation vehicle and a transit location of the transportation vehicle to park to temporarily store the at least one first remaining product with the medium priority level;

autonomously loading the transportation vehicle with the at least one first remaining product with the medium priority level, wherein autonomously loading the transportation vehicle further includes causing a robotic device to load the transportation vehicle with the at least one first remaining product based on determining the at least one first remaining product exceeds a pre-determined weight threshold estimating a return-back timeframe for the at least one first remaining product with the medium priority level to be returned to the storage facility;

automatically deploying the transportation vehicle to the identified transit location based on the return-back timeframe; and autonomously unloading the transportation vehicle and moving the at least one first remaining product with the medium priority level back to the storage facility after the selected timeframe ends, wherein autonomously unloading the transportation vehicle further includes causing the robotic device to unload the at least one first remaining product from the transportation vehicle.

12. The computer program product of claim 11, wherein the return-back timeframe is a period of time immediately after the selected timeframe when the at least one first remaining product with the medium priority level is expected to earn high priority status.

13. The computer program product of claim 11, wherein a distance between the transit location of the transportation vehicle and the storage facility is directly proportional to a length of the return-back timeframe, wherein a longer return-back timeframe results in a greater distance between the transit location of the transportation vehicle and the storage facility.

14. The computer program product of claim 11, wherein the at least one first remaining product with the medium priority level is sold as inventory while stored in the transportation vehicle at the identified transit location in response to determining there is consumer demand at the identified transit location based on the real-time and the historical data.

* * * * *